United States Patent [19]
Fujimori et al.

[11] Patent Number: 6,094,018
[45] Date of Patent: Jul. 25, 2000

[54] METHOD AND APPARATUS FOR PROVIDING MOIRÉ EFFECT CORRECTION BASED ON DISPLAYED IMAGE RESOLUTION

[75] Inventors: Shin Fujimori; Taro Tadano; Masanobu Kimoto, all of San Diego, Calif.

[73] Assignees: Sony Corporation, Tokyo, Japan; Sony Electronics, Inc., Park Ridge, N.J.

[21] Appl. No.: 09/165,170

[22] Filed: Oct. 1, 1998

[51] Int. Cl.$^7$ ................................................. G09G 01/04
[52] U.S. Cl. ........................ 315/370; 315/382.1; 345/14; 348/524
[58] Field of Search ..................... 315/370, 364, 315/1, 382.1; 345/10, 11, 12, 13, 14; 348/266, 284, 289, 325, 521, 524, 806

[56] References Cited

U.S. PATENT DOCUMENTS

| | | | |
|---|---|---|---|
| 4,887,010 | 12/1989 | Fujimura | 315/370 |
| 5,107,188 | 4/1992 | Rindal | 315/370 |
| 5,315,310 | 5/1994 | Eagle et al. | 345/14 |
| 5,430,502 | 7/1995 | Yamazaki et al. | 315/370 |
| 5,440,353 | 8/1995 | Yamazaki et al. | 315/382.1 |
| 5,672,939 | 9/1997 | Hsiesh | 315/382.1 |
| 5,747,933 | 5/1998 | Beeteson et al. | 315/370 |
| 5,767,632 | 6/1998 | Yoshida et al. | 315/370 |
| 5,777,441 | 7/1998 | Yoshida et al. | 348/806 |
| 5,777,686 | 7/1998 | Jennes et al. | 348/521 |
| 5,777,698 | 7/1998 | Park | 315/370 |
| 5,872,432 | 2/1999 | Beeteson | 315/382.1 |

FOREIGN PATENT DOCUMENTS

| | | | |
|---|---|---|---|
| 63-275284 | 11/1988 | Japan | H04N 9/18 |
| 6-121195 | 4/1994 | Japan | H04N 5/21 |

*Primary Examiner*—Don Wong
*Assistant Examiner*—Thuy Vinh Tran
*Attorney, Agent, or Firm*—Blakely, Sokoloff, Taylor & Zafman LLP

[57] ABSTRACT

In a display monitor, a horizontal synchronization signal having a horizontal scanning frequency is received by a first circuit. A vertical synchronization signal having a vertical scanning frequency is received by a second circuit. A moiré correction signal that is proportional to a horizontal resolution of the displayed image is generated by dividing the horizontal scanning frequency by the vertical scanning frequency.

18 Claims, 3 Drawing Sheets

METHOD AND APPARATUS FOR PROVIDING MOIRÉ EFFECT CORRECTION BASED ON DISPLAYED IMAGE RESOLUTION

BACKGROUND OF THE INVENTION

1. Field of the Invention

The present invention relates to a method and apparatus for correcting the moiré effect on a display monitor based on displayed image resolution.

2. Background Information

Color cathode ray tubes (CRTs) are commonly used as visual display devices, employing up to three electrodes, typically one for each primary color: red, green, and blue. Most color CRTs use a shadow mask to selectively illuminate a matrix of each electrode's respective colored phosphors (i.e., red, green, and blue). The beam is typically larger than the shadow mask opening size, so the shadow mask blocks part of the beam and casts a portion of the original beam onto the desired phosphor. The dot pitch, or spacing, between adjacent shadow mask openings is typically between 0.2 and 0.3 mm to achieve a high resolution display.

A video pattern displayed on the CRT is comprised of a array of pixels, typically 640 to 1280 pixels wide and 480 to 1024 pixels high. One pixel will typically illuminate several screen dots. The number of screen dots illuminated is inversely proportional to the resolution of the video pattern. At higher video resolutions the number of screen dots illuminated can be less than three. At these higher resolutions an interference pattern, typically termed the moiré effect, can appear. From an operating standpoint, the moiré interference phenomenon poses a serious aesthetic problem, since the best electron beam focus and the highest image resolution results in generating an unacceptably noticeable moiré effect if the video signal being displayed includes alternating pixel patterns, which is a common occurrence.

The moiré effect becomes stronger as the horizontal resolution of the displayed image increases and as the pixel size approaches the size of the screen dot pitch. Accordingly, a larger correction signal is required at higher resolutions. An apparatus that provides a range of adjustment that is large enough for a high resolution image will be overly sensitive when correcting the moiré effect of a lower resolution image. Conversely, an apparatus that provides a range of adjustment that is appropriate for a low resolution image will not provide sufficient adjustment when correcting the moiré effect of a higher resolution image. Accordingly, what is needed is a moiré correction apparatus that provides appropriate moiré correction signals for higher resolution and lower resolution images.

SUMMARY OF THE INVENTION

In a display monitor, a horizontal synchronization signal having a horizontal scanning frequency is received by a first circuit. A vertical synchronization signal having a vertical scanning frequency is received by a second circuit. A moiré correction signal that is proportional to a horizontal resolution of the displayed image is generated by dividing the horizontal scanning frequency by the vertical scanning frequency.

DETAILED DESCRIPTION OF THE INVENTION

A method for correcting the moiré effect on a CRT display monitor that provides a larger moiré correction signal for higher resolution images and a smaller moiré correction signal for lower resolution images, is disclosed.

Principles of Operation

The horizontal resolution of a displayed image is in a fixed proportion to the vertical resolution in a typical display system. The horizontal resolution is therefore equal to the vertical resolution multiplied by a constant k. A 4 to 3 ratio of horizontal to vertical resolution is typical. The relationship between the horizontal and vertical resolution is represented by:

$$\text{horizontal resolution} = \text{vertical resolution} \times k$$

The vertical resolution of a display is substantially equal to the horizontal scanning frequency $f_H$ divided by the vertical scanning frequency $f_v$. Therefore, the horizontal resolution can be represented by:

$$\text{horizontal resolution} = (f_H/f_v) \times k$$

The horizontal resolution of a displayed image is not directly available to a display system. However, the horizontal scanning frequency $f_H$ and the vertical scanning frequency $f_v$ are measurable in the display system. Using the above relationships, a signal can be generated that is proportional to the horizontal resolution for the purpose of providing a larger moiré correction signal for higher resolution images and a smaller moiré correction signal for lower resolution images.

Implementation

Figure 1:
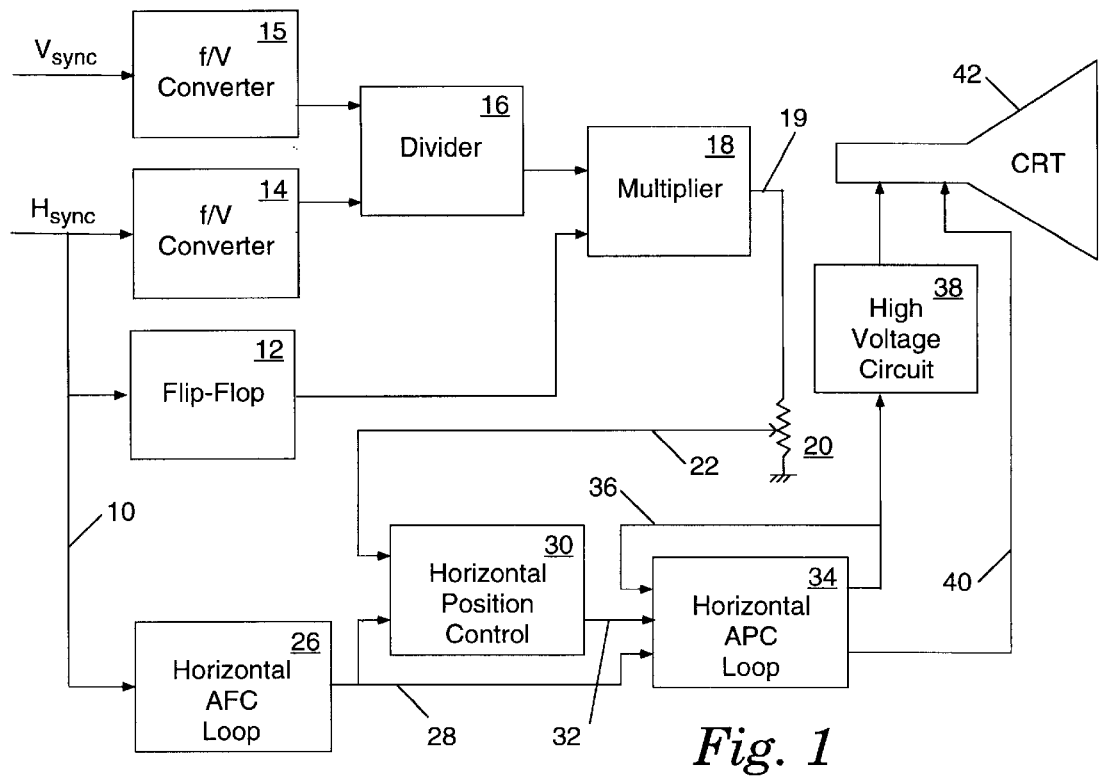
FIG. 1 illustrates one embodiment of a moiré correction circuit of the present invention.

FIG. 1 illustrates one embodiment of the invention. In this embodiment, alternating horizontal lines of the display are shifted horizontally by a small distance in response to the moiré correction signal to correct the moiré effect. A first frequency to voltage converter 14 produces a first voltage signal that is substantially proportional to the horizontal scanning frequency. A second frequency to voltage converter 15 produces a second voltage signal that is substantially proportional to the vertical scanning frequency. A divider 16 divides the first voltage signal by the second voltage signal to produce a third voltage signal substantially proportional to the horizontal scanning frequency divided by the vertical scanning frequency $f_H/f_v$. As discussed above, the horizontal resolution will be proportional to this third voltage.

Flip-flop 12 receives $H_{sync}$ 10 and produces an output signal with one-half the horizontal synchronization frequency. The output of the divider 16 is multiplied by the output of the flip-flop 12 by multiplier 18 to produce a moiré adjustment signal 19 with an amplitude substantially proportional to the horizontal resolution and a frequency of one-half the scanning frequency. In one embodiment of the invention, the moiré adjustment signal 19 is the maximum signal applied to $H_{pos}$ 22. The moiré adjustment signal 19 is supplied to moiré adjustment control 20. Moiré adjustment control 20 can be adjusted to provide a value for $H_{pos}$ 22 that has an amplitude proportional to the moiré adjustment signal 19. As a result, the moiré correction signal is proportional to the horizontal resolution of the displayed image.

Figure 2:
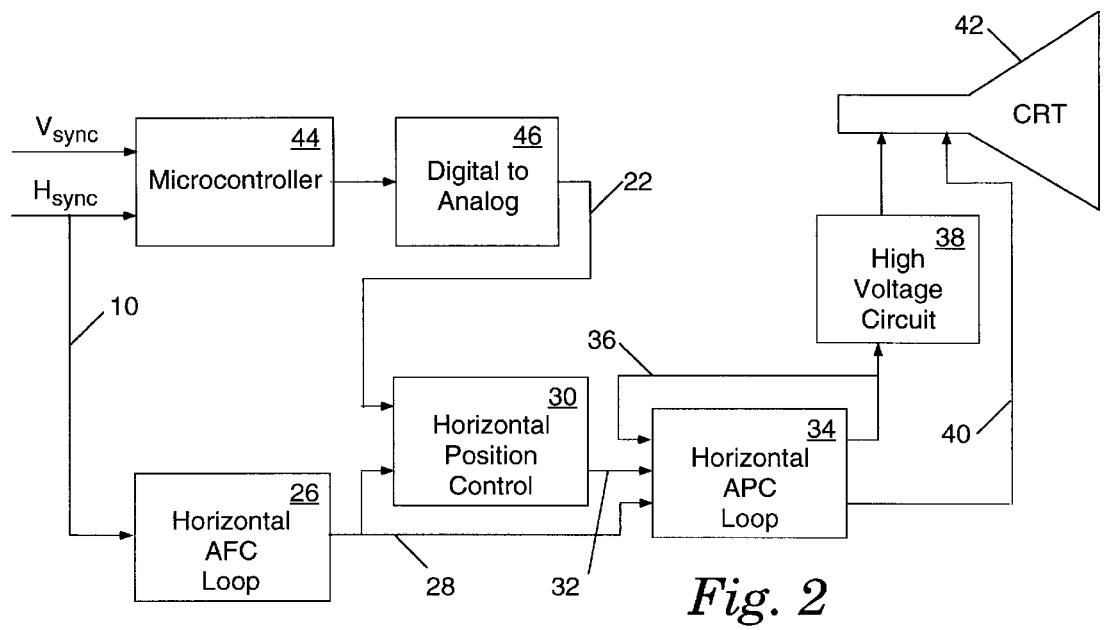
FIG. 2 illustrates a second embodiment of a moiré correction circuit of the present invention.

FIG. 2 illustrates another embodiment of the invention. In this embodiment, the moiré adjustment control comprises digital inputs that are sensed by microcontroller 44 and stored as a digital value M. The microcontroller 44 senses $H_{sync}$ 10 and produces a first digital value that is substantially proportional to the horizontal scanning frequency. The microcontroller 44 senses $V_{sync}$ 10 and produces a second digital value that is substantially proportional to the vertical scanning frequency. The microcontroller 44 generates a sequence of digital values that alternate between 0 and a value that is substantially proportional to horizontal resolution, $(f_H/f_v)$, at a frequency of one-half the horizontal scanning frequency. The sequence of digital values are transmitted to a digital to analog converter 46 to generate $H_{pos}$ 22 such that alternating horizontal lines of the display are shifted horizontally responsive to the setting of the moiré adjustment control value. In another embodiment of the invention, the microcontroller 44 also senses a vertical synchronization signal and generates a sequence of digital values such that lines that are shifted during one vertical frame are not shifted during a following vertical frame and lines that are not shifted during the one vertical frame are shifted during the following vertical frame.

In another embodiment of the invention, the microcontroller 44 generates a sequence of digital values that alternate between 0 and a value that is substantially proportional to horizontal resolution multiplied by the horizontal frequency, $f_H \times (f_H/f_v)$, at a frequency of one-half the horizontal scanning frequency. The horizontal frequency term compensates for the lag of a horizontal driver circuit, exemplified in this embodiment by a horizontal APC loop 34, as discussed below.

Figure 3:
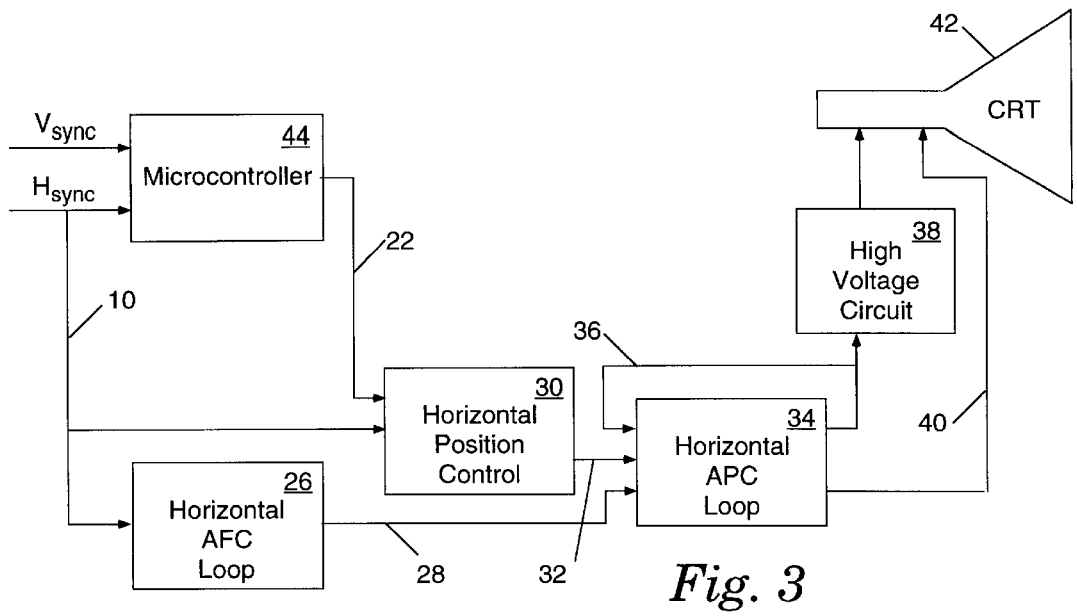
FIG. 3 illustrates a third embodiment of a moiré correction circuit of the present invention.

In another embodiment of the invention illustrated in FIG. 3, the horizontal position control circuit 30 is implemented as a digital circuit. The horizontal position control circuit 30 receives $H_{pos}$ 22 as a digital value and $H_{sync}$ 10. The horizontal position control circuit 30 generates $H_{ref}$ 32 by creating a timed delay from the leading edge of $H_{sync}$ 10 to the phase shifted edge of $H_{ref}$ 32. based on the value of $H_{pos}$ 22.

The CRT display monitor includes a horizontal synchronization circuit which controls horizontal position of the displayed image. The horizontal synchronization circuit of the CRT display shown in FIG. 1 includes a horizontal automatic frequency control (AFC) loop 26, a horizontal position control 30, and a horizontal automatic phase control (APC) loop 34, also termed a horizontal driver circuit. The horizontal synchronization circuit receives a horizontal synchronization signal ($H_{sync}$) 10 and generates a horizontal sweep signal 40 that is applied to the CRT deflection circuits and a flyback pulse 36 that is applied to a high voltage circuit to generate high voltage current for the CRT 42. The phase shift between $H_{sync}$ 10 and the flyback pulse 36 controls the horizontal position of the displayed image.

The AFC loop 26 receives $H_{sync}$ 10 and generates a sawtooth waveform 28 of the same frequency as $H_{sync}$ 10.

These waveforms, without the application of the invention, are illustrated in FIG. 3. The horizontal position control circuit 30 receives the sawtooth waveform 28 and a horizontal position signal ($H_{pos}$) 22, shown by the dashed level superimposed on the sawtooth waveform 28 in FIG. 3, and generates a horizontal reference signal ($H_{ref}$) 32 of the same frequency as $H_{sync}$ 10 with an edge that is phase shifted from $H_{sync}$ 10 responsive to $H_{pos}$ 22. The phase shifted edge controls the horizontal position of the displayed image. The image will move to the right as the difference in phase between $H_{sync}$ 10 and $H_{ref}$ 32, $\phi_0 - \phi_H$, increases.

Figure 4:
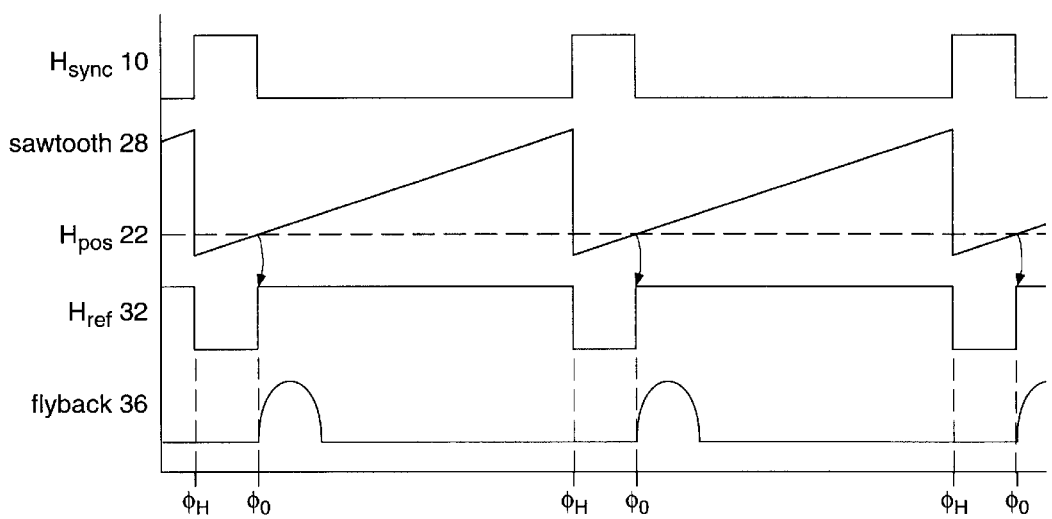
FIG. 4 illustrates waveforms generated in a horizontal synchronization circuit prior to the application of the invention.

In one embodiment of the invention, a moiré canceling signal with a frequency of one-half the frequency of $H_{sync}$ 10 is generated by a flip-flop 12 and a variable resistor 20. The moiré canceling signal is applied to $H_{pos}$ 22 to cause a small additional phase shift in $H_{ref}$ 32 on every other cycle. This is illustrated in FIG. 4 which shows the signals of FIG. 3 for the time from the leading edge of $H_{sync}$ 10 to the leading edge of the flyback pulse 36. In one cycle, the output of the flip-flop 12 is zero and there is no additional phase shift of $H_{ref}$ 32. $H_{pos0}$, $H_{ref0}$ and flyback$_0$ illustrate an unshifted cycle. In the following cycle, the output of the flip-flop 12 is one and there is an additional phase shift of $H_{ref}$ 32. $H_{pos1}$, $H_{ref1}$ and flyback$_1$ illustrate a shifted cycle. The phase shift between $H_{ref1}$ and $H_{ref0}$, $H_{\phi shift} = \phi_{0'} - \phi_{1'}$, represents the desired horizontal shift in position between two consecutive display lines for the purpose of correcting the moiré effect.

The horizontal APC loop 34 generates the flyback pulse 36 which tracks the phase of $H_{ref}$ 32. The APC loop 34 receives the sawtooth waveform 28 and generates the flyback pulse 36 that is applied to a high voltage circuit to generate high voltage current for the CRT 42 and a horizontal sweep signal 40 that is applied to the CRT deflection circuits. The APC loop 34 compares the phase of the generated flyback pulse 36 to the phase of $H_{ref}$ 32 in a feedback circuit that adjusts the phase of the generated flyback pulse 36 to track the phase of $H_{ref}$ 32.

Figure 5:
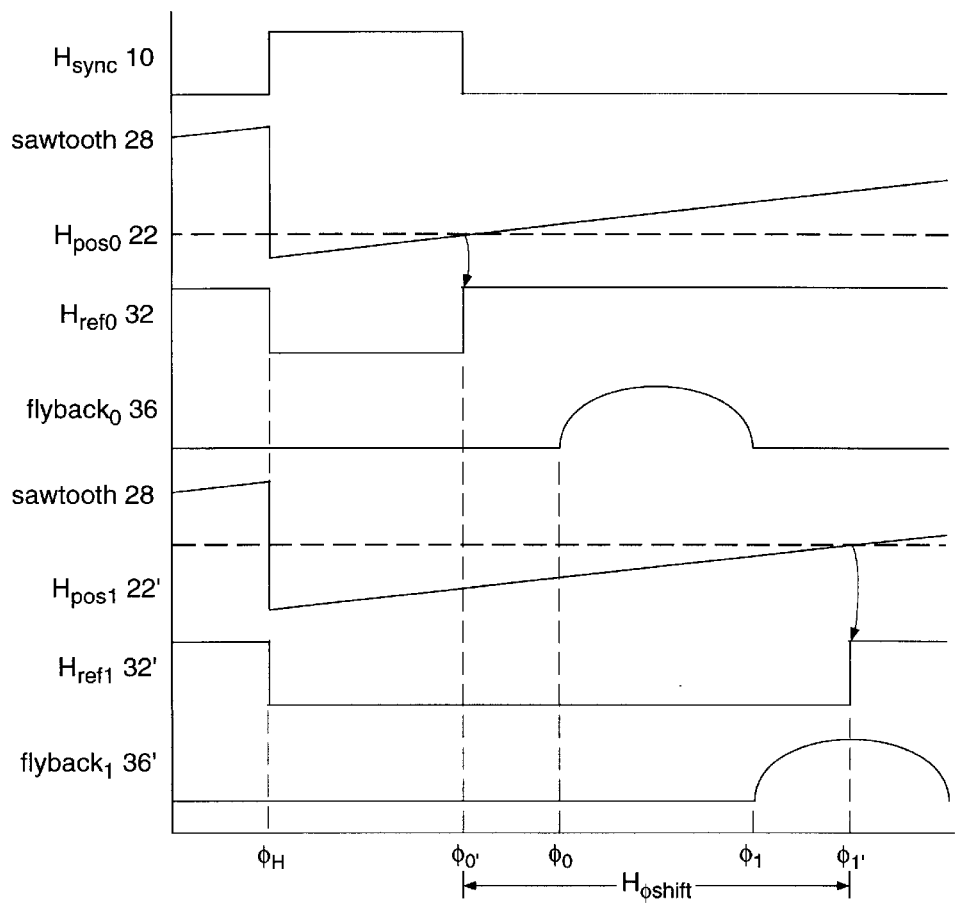
FIG. 5 illustrates waveforms in one embodiment of a moiré correction circuit of the present invention.
Figure 6:
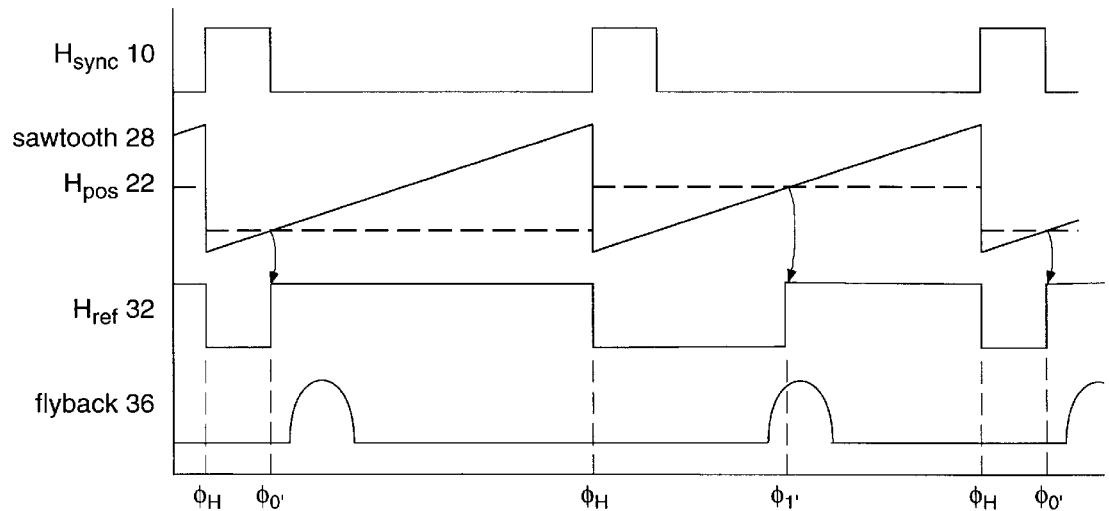
FIG. 6 illustrates another view of certain waveforms in one embodiment of a moiré correction circuit of the present invention.

The phase of the flyback pulse 36 does not equal the phase of $H_{ref}$ 32, as shown in FIG. 4, because the time constant of the feedback loop of the horizontal APC loop 34 prevents the phase of the flyback pulse 36 from being changed to fully match a change in the phase of $H_{ref}$ 32 in the time of one cycle. This is illustrated in FIG. 4 by the phase shift between $\phi_0$ and $\phi_{0'}$, and between $\phi_1$ and $\phi_{1'}$. In one cycle time, the phase of the flyback pulse 36 will only change by a fraction of the amount that the phase of $H_{ref}$ 32 changes. The moiré canceling signal applied to $H_{pos}$ 22 is therefore increased by an amount that is proportional to the horizontal scanning frequency to produce an additional phase shift in $H_{ref}$ 32 to compensate for the lag of the horizontal APC loop 34 in responding to changes in the phase of $H_{ref}$ 32. FIG. 5 shows the alternating value of $H_{pos}$ 22, the changing phase of $H_{ref}$ 32, and the lagging flyback pulses 36. It will be understood that the magnitude of the shifts illustrated in FIGS. 3 and 4 have been exaggerated to clearly show the relationships of the signals.

The invention increases the adjustment for correction of the moiré effect when the resolution of the displayed image is higher, requiring a larger correction. When the resolution of the displayed image is reduced, the invention reduces the adjustment for correction of the moiré effect. As a result, the adjustment for correction of the moiré effect is essentially independent of the resolution of the displayed image. Further, the available moiré correction has a range that is suitable for the resolution of the displayed image.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A circuit for correcting a moiré effect on a display comprising:

a first circuit to receive a horizontal synchronization signal having a horizontal scanning frequency;

a second circuit to receive a vertical synchronization signal having a vertical scanning frequency;

a divider circuit, coupled to the first and second circuits, that generates a moiré correction signal having a value substantially proportional to the horizontal scanning frequency divided by the vertical scanning frequency, the moiré correction signal being provided to the display for correcting the moiré effect; and a horizontal driver circuit, coupled to the divider circuit to receive the moiré correction signal, the horizontal driver circuit generating a flyback pulse having a first frequency substantially equal to the horizontal scanning frequency and a flyback phase that is shifted from a synchronization phase of the horizontal synchronization signal substantially in proportion to the moiré correction signal on alternate cycles of the horizontal synchronization signal, the flyback phase controlling a horizontal position of lines on the display and thereby correcting the moiré effect.

2. The circuit of claim 1, wherein the divider circuit generates the moiré correction signal having the value substantially proportional to the horizontal scanning frequency multiplied by the horizontal scanning frequency divided by the vertical scanning frequency.

3. The circuit of claim 1, wherein the horizontal driver circuit further comprises receiving a horizontal adjustment signal and generating the flyback phase substantially in proportion to the horizontal adjustment signal added to the moiré correction signal on alternate cycles of the horizontal synchronization signal.

4. The circuit of claim 1, wherein the horizontal driver circuit is further coupled to the second circuit to receive the vertical synchronization signal, and where the horizontal driver circuit shifts the flyback phase of a first cycle of the flyback pulse after receiving the vertical synchronization signal if a preceding first cycle of the flyback pulse after receiving a preceding vertical synchronization signal was not shifted.

5. The circuit of claim 1, further comprising:

a horizontal position control circuit, coupled between the divider circuit and the horizontal driver circuit, to generate a horizontal reference signal having a second frequency substantially equal to the horizontal scanning frequency and a reference phase that is shifted from the synchronization phase of the horizontal synchronization signal substantially in proportion to the moiré correction signal on alternate cycles of the horizontal reference signal; and the horizontal driver circuit generating the flyback pulse having the flyback phase that is substantially equal to the reference phase.

6. The circuit of claim 1, wherein the moiré correction signal is generated by a microcontroller.

7. A cathode ray tube display system for receiving and displaying a video signal comprising a horizontal synchronization signal and a vertical synchronization signal, the cathode ray tube display system comprising:

a moiré correction circuit that receives the horizontal synchronization signal and the vertical synchronization signal, having respectively a horizontal scanning frequency and a vertical scanning frequency, and the moiré correction circuit generates a moiré correction signal, having a correction value substantially proportional to the horizontal scanning frequency divided by the vertical scanning frequency;

a display that receives the video signal and displays a corrected video signal based on the moiré correction signal, and a moiré adjustment circuit that receives the horizontal synchronization signal, that receives a moiré adjustment signal substantially proportional to a level of moiré correction, and generates a horizontal position signal having a first frequency proportional to the horizontal scanning frequency and an adjustment value substantially proportional to the moiré adjustment signal and the moiré correction signal;

a horizontal driver circuit that receives the horizontal position signal, that receives the horizontal synchronization signal, and generates a flyback pulse having a second frequency substantially equal to the horizontal scanning frequency and a flyback phase that is shifted from a synchronization phase of the horizontal synchronization signal substantially in proportion to the horizontal position signal; and the display that further receives the flyback pulse having the flyback phase controlling a horizontal position of lines on the display to correct the moiré effect.

8. The cathode ray tube display system of claim 7, wherein the moiré correction circuit generates the moiré correction signal having the correction value substantially proportional to the horizontal scanning frequency multiplied by the horizontal scanning frequency divided by the vertical scanning frequency.

9. The cathode ray tube display system of claim 7, wherein the horizontal driver circuit further receives a horizontal adjustment signal and generates the flyback pulse having the flyback phase substantially in proportion to the horizontal adjustment signal added to the moiré correction signal on alternate cycles of the horizontal synchronization signal.

10. The cathode ray tube display system of claim 7, wherein the horizontal driver circuit further receives the vertical synchronization signal, and shifts the flyback phase of a first cycle of the flyback pulse after receiving the vertical synchronization signal if a preceding first cycle of the flyback pulse after receiving a preceding vertical synchronization signal was not shifted.

11. The cathode ray tube display system of claim 7, further comprising:

a horizontal position control circuit that receives the horizontal position signal, that receives the horizontal synchronization signal, and generates a horizontal reference signal having a third frequency substantially equal to the horizontal scanning frequency and a reference phase that is shifted from the synchronization phase of the horizontal synchronization signal substantially in proportion to the horizontal position signal;

the horizontal driver circuit generating the flyback pulse having the flyback phase that is substantially equal to the reference phase.

12. The cathode ray tube display system of claim 7, wherein the moiré correction circuit comprises a microcontroller.

13. A method of correcting a moiré effect on a display comprising:

receiving a horizontal synchronization signal having a horizontal scanning frequency;

receiving a vertical synchronization signal having a vertical scanning frequency;

generating a moiré correction signal having a correction value substantially proportional to the horizontal scanning frequency divided by the vertical scanning frequency;

providing the moiré correction signal to the display for correcting the moiré effect; and generating a horizontal position signal having a first frequency proportional to the horizontal scanning frequency and a position value substantially proportional to the moiré correction signal;

generating a flyback pulse in a horizontal driver circuit, the flyback pulse having a second frequency substantially equal to the horizontal scanning frequency and a flyback phase that is shifted from a synchronization phase of the horizontal synchronization signal substantially in proportion to the horizontal position signal, the flyback phase controlling a horizontal position of lines on the display and thereby correcting the moiré effect.

14. The method of claim 13, wherein generating the moiré correction signal comprises generating the moiré correction signal having the correction value substantially proportional to the horizontal scanning frequency multiplied by the horizontal scanning frequency divided by the vertical scanning frequency.

15. The method of claim 13, further comprising receiving a horizontal adjustment signal and generating the flyback phase substantially in proportion to the horizontal adjustment signal added to the moiré correction signal on alternate cycles of the horizontal synchronization signal.

16. The method of claim 13, wherein generating the flyback pulse further comprises receiving the vertical synchronization signal, and shifting the flyback phase of a first cycle of the flyback pulse after receiving the vertical synchronization signal if a preceding first cycle of the flyback pulse after receiving a preceding vertical synchronization signal was not shifted.

17. The method of claim 13, further comprising:

generating a horizontal reference signal having a third frequency substantially equal to the horizontal scanning frequency and a reference phase that is shifted from the synchronization phase of the horizontal synchronization signal substantially in proportion to the horizontal position signal;

generating the flyback pulse in the horizontal driver circuit, the flyback pulse having the flyback phase that is substantially equal to the reference phase.

18. The method of claim 13, wherein the moiré correction signal is generated by a microcontroller.

\* \* \* \* \*